US006599614B1

(12) United States Patent
Roussel et al.

(10) Patent No.: US 6,599,614 B1
(45) Date of Patent: Jul. 29, 2003

(54) THREE PLY ABSORBENT PAPER PRODUCT AND METHOD OF MAKING

(75) Inventors: Gilles Roussel, Colmar (FR); Benoît Hoeft, Bischwihr (FR)

(73) Assignee: Georgia-Pacific France, Kunheim (FR)

( * ) Notice: Subject to any disclaimer, the term of this patent is extended or adjusted under 35 U.S.C. 154(b) by 0 days.

(21) Appl. No.: 09/623,555

(22) PCT Filed: Mar. 5, 1999

(86) PCT No.: PCT/FR99/00504

§ 371 (c)(1),
(2), (4) Date: Oct. 5, 2000

(87) PCT Pub. No.: WO99/45205

PCT Pub. Date: Sep. 10, 1999

(30) Foreign Application Priority Data

Mar. 6, 1998 (FR) ........................................... 98 02792

(51) Int. Cl.$^{7}$ ............................ B32B 3/00; D21H 11/00

(52) U.S. Cl. ....................... 428/172; 428/154; 428/166; 428/212; 162/109

(58) Field of Search ................................ 428/154, 155, 428/156, 166, 172, 906, 212; 162/111, 112, 113, 109

(56) References Cited

U.S. PATENT DOCUMENTS 3,414,459 A * 12/1968 Wells ......................... 428/154
5,173,351 A * 12/1992 Ruppel et al. .............. 428/154

FOREIGN PATENT DOCUMENTS

WO WO97/48551 * 12/1997

* cited by examiner

*Primary Examiner*—Donald J. Loney
(74) *Attorney, Agent, or Firm*—Breiner & Breiner, L.L.C.

(57) ABSTRACT

The invention concerns an absorbent paper product with basic weight of about 36 to about 105 g/m$^2$ comprising at least three pleats, a first and second outer embossed pleats each comprising raised patterns consisting at least partially of discrete protuberances oriented towards the inside of the structure and a non-embossed central pleat, the pleats being associated by linking the distal surfaces of at least part of the protuberances of each of the outer pleats to the central pleat. The invention is characterised in that each of the embossed outer pleats is linked by means of an adhesive to said central pleat, and at least one of the pleats has a pattern density more than 30 protuberances per cm$^2$.

17 Claims, 3 Drawing Sheets

THREE PLY ABSORBENT PAPER PRODUCT AND METHOD OF MAKING

FIELD OF INVENTION

The invention relates to absorbent paper products and, more specifically, to those made of cellulose wadding for sanitary or household use. It applies basically to toilet paper, though it is optionally applicable also to such household papers as paper towels, napkins or handkerchiefs.

BACKGROUND OF THE INVENTION

In general, such papers consist of one or more cellulose wadding plies or superposed layers. The plies can be bonded to each other. In the case of toilet paper, conventional products comprise two, three or even four assembled plies.

More specifically, the invention concerns a product of at least three plies and its method of manufacture.

U.S. Pat. No. 3,414,459 describes an absorbent paper structure including at least two embossed plies. Mention is made therein of a product of three assembled plies, a third ply being sandwiched between two external embossed plies. This structure is based on the plies each having a specific surface weight of about 17 g/cm$^2$. In the manufacturing method of this patent, the two external plies are separately embossed with a salient pattern consisting of discrete protrusions. Each of the plies is made to pass between a saliently engraved metal cylinder forming the desired pattern and a smooth rubber cylinder. Each ply so made generally has a pattern pitch of 3 to 30 protrusions or salient tips per unit area, here cm$^2$. In the text below, the expression "pattern density" denotes the number of protrusions per unit area. As regards the three-ply structures illustrated in the above patent, the pattern density is about 11 protrusions/cm$^2$. The unembossed third ply is sandwiched between the two embossed plies and, more specifically, is placed between the distal surfaces or peaks of each ply. In other words, the protrusions point to the inside of the structure. The three plies are assembled by being made to pass through the clamping gap present between two metal cylinders, each engraved with embossing means, for the external plies. The salient elements of each engraved cylinder are mutually opposite. This combining technique is generally called "tip-to-tip". In the case of the above patent, the three plies are mutually bonded by applying a sufficiently high pressure to produce interfiber links. No adhesive is applied to the distal pattern surfaces of the protrusions of the external plies.

The manufacturing method described in the prior patent entails rapid wear of the embossing cylinders because of the high clamping pressure required to assemble the three plies. To the knowledge of applicant, this method is not used in industry. Lastly, the structure manifests low pattern density (about 10–15 protrusions/cm$^2$). The triple-ply products with such a structure are mainly used as household paper towels for which the main desired properties are strength and, especially, absorption. On this account, the embossing patterns are comparatively deep and hence of low density.

Other absorbent paper products constituted of three plies can be made using different assemblies. Using two distinct embossing apparatus, on one hand a set of two superposed plies is embossed and on the other hand a third ply is embossed. The first two superposed plies as well as the third ply are embossed with salient patterns consisting of protrusions. The pattern density perforce is low, namely less than 20 protrusions/cm$^2$ for this sort of product. The two superposed plies and the third ply are assembled using a mating cylinder so that the distal protrusion surfaces of the two superposed plies are opposite the surfaces situated between two protrusions in the plane of the third ply. This technique is called "nested".

A method for combining three plies is described in European Application No. 0,570,578. This method consists in separately embossing a first and second web itself consisting of the superposition of two layers using a first and second embossing means including an embossing pattern having a density less than 20 protrusions/cm$^2$. Then, depositing at least in part an adhesive on the peaks of the protrusions formed in the first or second web and assembling the two webs using a non-yielding, mating cylinder running parallel to one of the engraved cylinders of an embossing means in such a manner that their protrusions mutually nest. In this method, the mating cylinder is kept as a stop at a predetermined minimum distance from the engraved cylinder.

Thick products with a good feel are obtained from such products. However, especially as regards toilet paper, softness is less than optimal because of the comparatively coarse embossing. Also, strong embossing is required to arrive at the desired substantial thickness.

Further compound products consisting of three plies have been disclosed. Illustratively, European Application No. 0,564,319 describes a product having three plies that were embossed separately and assembled consecutively. More specifically, small and large protrusions are embossed into a first ply and protrusions are embossed in a second ply. These protrusions are separated from each other by the same distance as the small protrusions of the first ply and their height is such that the sum of their height and that of a small protrusion of the first ply is equal at least to the height of a large protrusion of the first ply. The protrusion ends of the second ply are coated with adhesive and then a pad is created between the first and second plies by superposing the small protrusion ends of the first ply with the protrusion ends of the second ply in tip-to-tip positions. Moreover, a third ply is embossed separately at a pitch identical with that of the large protrusions of the first ply. The protrusion ends of the third ply also are coated with adhesive and this third ply is assembled with the pad formed between the first two plies in such a manner that the protrusion ends of the third ply bond in tip-to-tip manner with the second ply near the large protrusions of the first ply.

The product so made offers improved thickness and rigidity but its structure is comparatively complex, requiring several levels of bonding. The method itself is laborious and entails relatively complex industrial apparatus.

This method allows only manufacture of embossed products with pattern densities less than 20 protrusions/cm$^2$. Again, the thickness of products so made and consisting of three plies is not optimal.

OBJECTS AND BRIEF DESCRIPTION OF THE INVENTION

The object of the invention is to palliate the above noted drawbacks regarding both the products and their method of manufacture.

Another object of the invention is to provide a novel product including at least three plies which are both thick and soft and have a good touch, as well as further being crush-resistant when wound in a roll, thereby offering a combination of properties absent from existing products.

Still another object of the invention is a novel product of at least three plies of the point-to-point type, useful as toilet paper.

The object of the invention is an absorbent paper product where this product has an approximate specific surface weight of 36 to 105 g/m$^2$ and includes at least three plies, namely external first and second embossed plies each including salient patterns having at least in part discrete protrusions pointing inward of the structure, and a central unembossed ply. The plies are assembled by bonding the distal surfaces of at least a portion of the protrusions of each of the external plies to the central ply.

In an essential feature of the invention, each of the embossed external plies is adhesively bonded to the central ply and at least one of the external plies has a pattern density exceeding 30 protrusions/cm$^2$.

In a surprising manner, such a structure provides both softness and thickness. The fine embossing on one hand imparts great softness to the outer web surface and on the other hand provides good crushing strength. The latter property is enhanced by the central ply precluding any mutual nesting of the two external plies that would take place in the absence of the third ply because of the low support surface of such fine protrusions.

In an advantageous feature of the invention, each of the external plies has a pattern density less than 90 protrusions/cm$^2$.

In another feature of the invention, the pattern density of the external plies varies from one to the other. In still another advantageous feature, the two different patterns allow partial joining, that is, the number of bonding sites is less than the number of protrusions contacting the central ply. This partial bonding makes the web more pliant. In particular, one of the plies includes combined patterns, that is two different patterns, one of which is the background pattern. In particular, the two combined patterns can have different elevations relative to the ply's reference plane.

In still another feature of the invention, the fibrous and/or chemical composition of the central ply differs from each of the compositions of the external embossed plies.

Another object of the invention is a method for manufacturing an absorbent paper product including at least three bonded plies, each ply having a specific surface weight of about 12 to 35 g/m$^2$.

In another advantageous feature of the invention, the delamination strength between one of the external plies and the central ply is substantially different from that between the other external ply and the central ply.

In one feature of the invention, the method of the invention allows in particular the making of a product having a differential delamination strength involving:

embossing a first ply and a second ply with salient patterns of discrete protrusions, superposing a third unembossed ply on the protrusions of the first of the embossed plies, depositing an adhesive in particular on the third ply, and assembling the superposed first embossed ply and the third unembossed ply to the second embossed ply in such a manner that the distal protrusion surfaces of each of the first and second embossed plies are at least partly mutually opposite, and applying sufficient pressure to ensure bonding of the three plies by means of the adhesive.

In an advantageous feature of the invention, an aqueous adhesive is deposited to the outer surface of the third ply opposite the distal protrusion surfaces of the first ply.

In another feature of the invention, an aqueous adhesive is deposited with sufficient energy by atomization on the third ply in order that part of the adhesive crosses the third ply and allows subsequent bonding of the three plies to each other.

Other features and advantages of the invention are elucidated in the comprehensive description below and in relation to the attached drawings. other or in tip-to-tip positions. In the product illustratively shown in FIG. 1, the pitches of the external plies being respectively different, bonding takes place only where the protrusions are at least partially in the tip-to-tip positions illustrated by the positions Al and A2 as shown by products consisting of two plies and as described in European Patent Application No. 0,426,548. This bonding is implemented by adhesive being present on either side of the central ply 4 between the central ply and each of the embossed plies 2 and 3 at the positions A1 and A2.

The specific surface weight of the invention is approximately 36 to 105 g/m$^2$. The specific surface weight of the product plies of the invention is about 12 to 35 g/m$^2$ and preferably between 12 and 25 g/m$^2$.

The pattern density of at least one of the external patterns is higher than 30 protrusions/cm$^2$ and less than 300 protrusions/cm$^2$ and, preferably, the two external plies have a density less than 90 protrusions/cm$^2$. Each of the external plies furthermore can have one or more different patterns of different densities. Accordingly, the protrusion heights can be different, in which case the ply will have patterns of different elevations. European Application Nos. 0,426,548 and 0,797,705 illustrate products embossed in this manner but made of two plies.

In the product of the invention, the central ply is unembossed. The fibrous and/or chemical

DETAILED DESCRIPTION OF PRESENTLY PREFERRED EMBODIMENTS

Figure 1:
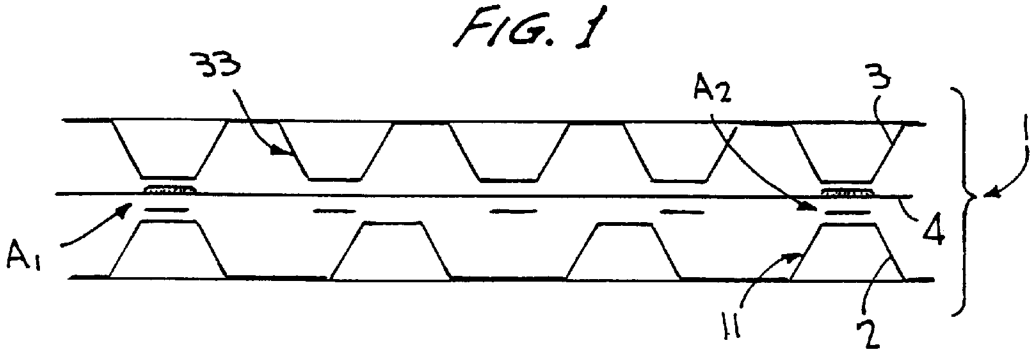
FIG. 1 is a cross-section of the structure of a product of the invention.

In FIG. 1, the product 1 of the invention includes three plies, namely a first external embossed ply 2, a second external embossed ply 3, and a central or third smooth or unembossed ply 4. The three plies are mutually bonded. The first external embossed ply includes protrusions 11 distributed at a constant and specific pitch. The external second embossed ply also includes protrusions 33 distributed at a specific, constant pitch which, however, differs from that of the protrusions 11 of the first ply. In the configuration of the product of the invention, the protrusions of each external embossed ply point inward. The three plies are mutually bonded at the distal surfaces of the protrusions of each external ply which are arranged opposite each compositions of the plies can be identical or different. For example, the composition of the central ply can be essentially fibrous based on long fibers, illustratively made of resin, while the external plies being mounted on either side of the central ply and forming the web surface are composed of essentially short fibers. This assembly allows the manufacture of a tougher product without losing the softness offered by the short fibers. The central ply can include a temporary or permanent wet-strength additive. If this additive already is present in some amount in each external ply, the central ply will include a greater quantity. Illustratively, a wet-strength additive is an epichlorohydrine polyamine type compound sold commercially by Hercules Corporation as "Kymene SLX". The external plies per se can include a softener or loosener. The web so constituted offers excellent wet strength and strength in general on account of the composition of the central ply. Furthermore, it offers surface softness due to the selection of the fibrous and chemical composition of the two external plies. Furthermore, each ply also can include one or more layers forming a laminate. In this case, the layers per se can have a different fibrous and/or chemical composition. The products of the invention offer very advantageous properties compared to the three-ply, or even two-ply, products presently on the market.

The thickness of a web of the invention is greater than the web thickness of a nested product made from plies identical to those of the invention (same nature, same fibrous and chemical composition, same manufacture) and embossed to offer the same final strength.

This feature is illustrated in the following embodiment based on the same cellulose wadding (tissue) and sold in standard form under the tradename MOLTONEL and having a protrusion density of 9 protrusions/cm$^2$ and based on a product of the invention, that is having external plies with patterns different from those of the standard product, namely 80 protrusions/cm$^2$ and different pitches in the direction of advance and in the transverse direction.

| | Standard | Invention |
|---|---|---|
| Number of Plies | 3 | 3 |
| Ply specific surface weight (g/cm$^2$) | 16, 18, 16 | 16, 18, 16 |
| Initial fabric strength (N/m) | | |
| Cross-direction (CD) | 186 | 186 |
| Machine-direction (MD) | 334 | 334 |
| Final strength of embossed product (N/m) | | |
| CD | 124 | 129 |
| MD | 297 | 289 |
| Thickness (mm) | 0.63 | 0.69 |

Be it noted that product thickness is increased if, all other conditions being equal, the product is manufactured in the manner of the invention and, in particular when the strength is kept constant.

This result is the more remarkable in that in general when the embossing pressure imparts the same product thickness, a pattern of 80 protrusions/cm$^2$ entails a loss in strength, relative to the basic web, more pronounced than that due to a pattern of 9 protrusions/cm$^2$.

It was observed furthermore that the mean thickness of a web of the invention when in a wound roll-form is larger than the mean thickness of the above-mentioned known product also in roll form. Consequently, using the same number of pre-cut segments in the web of the invention, it is possible to increase the volume of the rolls so made.

Surprisingly and in an advantageous manner, the product of the invention offers better crush resistance when wound in a roll than do the products presently on the market. Some known products tend to sag after having been wound and, in particular, are too yielding.

In this respect, the mean thickness of a web of the invention was measured, as well as a web from known products, by varying the loads applied to the web(s). A Lhomargy M120 micrometer was used, having a sensor surface of 25 cm$^2$ and at a descent speed of 2.7 mm/s.

| | Pressure (g/cm$^2$) Thickness (mm) | 20 | 80 | 120 | 180 | 200 |
|---|---|---|---|---|---|---|
| MOLTONEL | Mean of 10 tests | 65 | 0.48 | 0.4 | 0.33 | 0.31 |
| 3 nested plies 9 protrusions/cm$^2$ | Loss in thickness | 0<br>0% | −0.17<br>26.1% | −0.25<br>38.4% | −0.32<br>49.2% | −0.34<br>52.3% |
| Standard Product | Mean of 10 tests | 0.64 | 0.41 | 0.32 | 0.25 | 0.23 |
| 2 point-to-point plies 16 protrusions/cm$^2$ | Loss in thickness | 0<br>0% | −0.23<br>35.9% | −0.32<br>50% | −0.39<br>60% | −0.41<br>64% |
| Standard Product | Mean of 10 tests | 0.63 | 0.43 | 0.35 | 0.27 | 0.25 |
| 2 point-to-point plies 30 protrusions/cm$^2$ | Loss in thickness | 0 | −0.21<br>33.3% | −0.28<br>44.0% | −0.36<br>57.1% | −0.39<br>60.3% |
| INVENTION | Mean of 10 tests | 0.62 | 0.44 | 0.37 | 0.31 | 0.29 |
| 30 protrusions/cm$^2$ | Loss in thickness | 0 | −0.18<br>29% | −0.25<br>40% | −0.31<br>50% | −0.33<br>53% |
| INVENTION tests | Mean of 10 | 0.59 | 0.51 | 0.45 | 0.36 | 0.33 |
| 80 protrusions/cm$^2$ | Loss in thickness | 0 | −0.08<br>13% | −0.14<br>24% | −0.14<br>24% | −0.26<br>44% |

Figure 3:
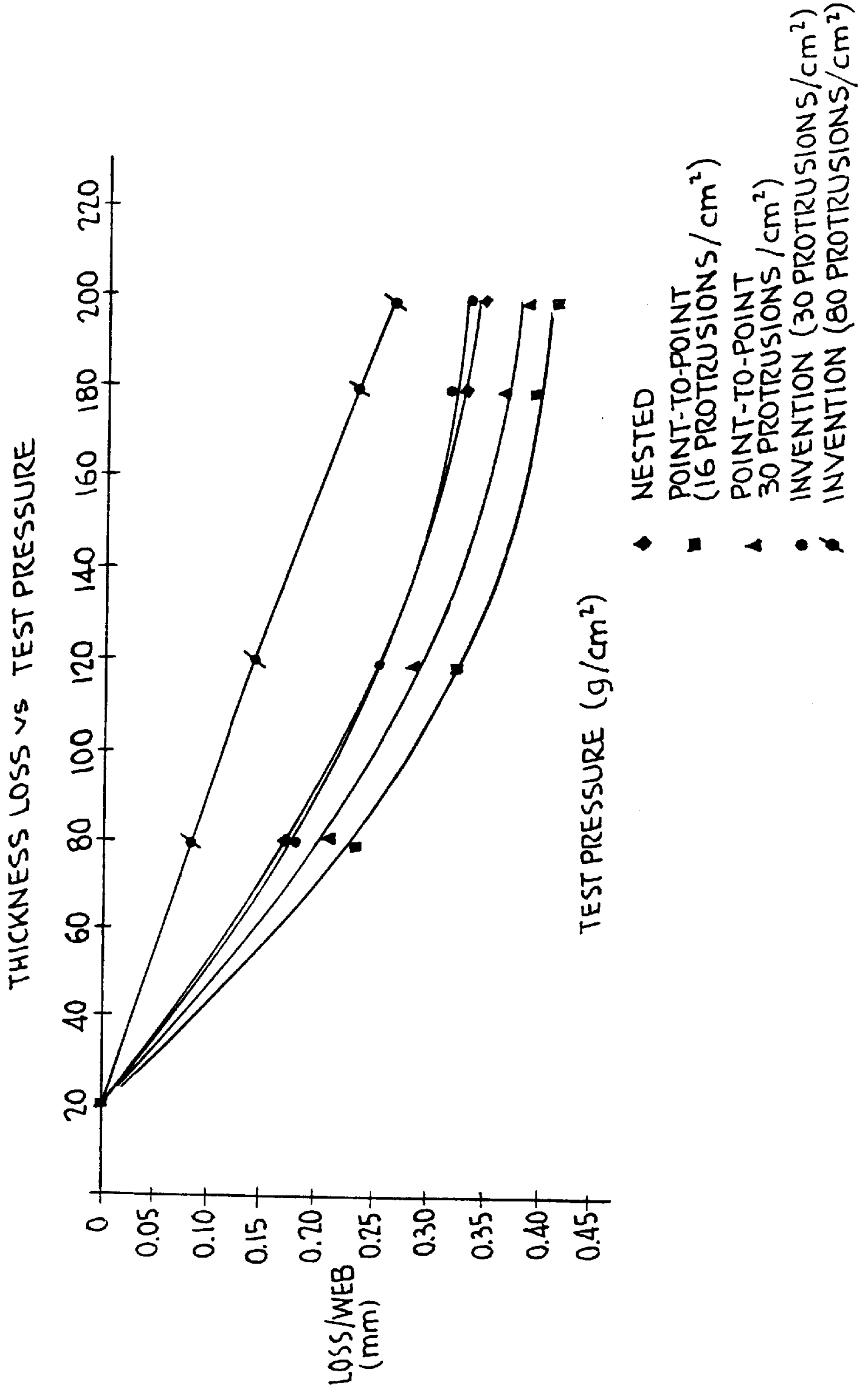
FIG. 3 is a plot of the loss in thickness as a function of pressure for the products of the invention compared with the products of the prior art.

FIG. 3 is a plot of the test results listed in the above Table.

It follows that the web of the invention is highly crush-resistant relative to a standard web of the point-to-point type. This strength increases as the protrusion density rises.

This behavior of the wound web of the invention in part explains the feasible increase in roll volume for a constant number of pre-cut formats.

Another test series was run varying the embossing pressure on products having a first pattern of 16 protrusions/cm$^2$ and products having 30 protrusions/cm$^2$. In both cases, 3 plies were assembled in the nested manner, that is, with a double ply nesting between the protrusions of a single ply. The plies of the invention also were joined.

The web thickness was measured for 3 embossing pressures and the measured values are listed in the Table below. The embossing pressure is defined by the length of the imprint deformation of the rubber cylinder on the engraved cylinder.

| | Specific surface weight | Thickness | Strength (N/m; 3 plies) | | Stretching |
|---|---|---|---|---|---|
| | (g/cm$^2$) | (mm) | MD | CD | MD % |
| Cellulose wadding | 47.2 | 0.26 | 381 | 195 | 18 |
| Embossing density: | | | | | |

-continued

| | Specific surface weight (g/cm$^2$) | Thickness (mm) | Strength (N/m; 3 plies) MD | Strength (N/m; 3 plies) CD | Stretching MD % |
|---|---|---|---|---|---|
| 16 protrusions/cm$^2$ | | | | | |
| Invention, E = 22 mm | 46.1 | 1.08 | 345 | 146 | 19 |
| Invention, E = 18 mm | 46.4 | 0.87 | 382 | 170 | 19 |
| Invention, E = 13 mm | 48.1 | 0.40 | 432 | 229 | 20 |
| Prior art, E = 22 mm | 43.5 | 0.67 | 279 | 105 | 15 |
| Prior art, E = 18 mm | 44.9 | 0.56 | 349 | 153 | 17 |
| Prior art, E = 13 mm | 45.7 | 0.42 | 397 | 200 | 19 |
| Embossing density: 30 protrusions/cm$^2$ | | | | | |
| Invention, E = 22 mm | 47.0 | 0.81 | 404 | 183 | 21 |
| Invention, E = 18 mm | 46.3 | 0.61 | 433 | 198 | 21 |
| Invention, E = 13 mm | 47.1 | 0.49 | 472 | 240 | 23 |
| Prior art, E = 22 mm | 44.0 | 0.48 | 354 | 144 | 16 |
| Prior art, E = 18 mm | 44.9 | 0.42 | 408 | 181 | 18 |
| Prior art, E = 13 mm | 45.7 | 0.34 | 430 | 217 | 20 |

It follows that for a given embossing pressure, the product of the invention offers a thicker final product.

Figure 4:
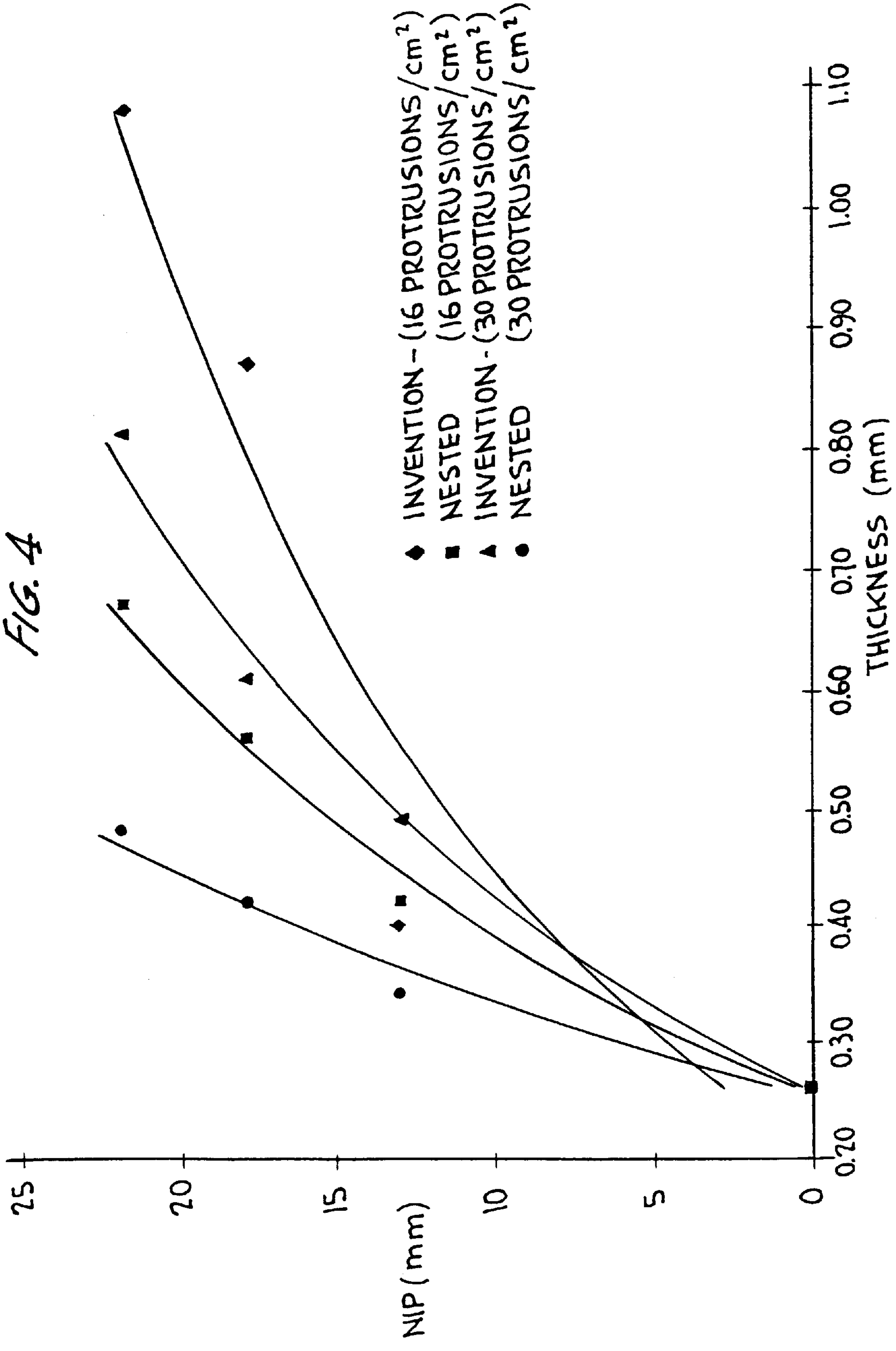
FIG. 4 is a plot of the thickness of the product of the invention at different embossing pressures compared with the thickness of products of the prior art.

This phenomenon is shown by the plot of FIG. 4.

Moreover, the strengths are higher despite the larger thicknesses.

These results show that at constant product thickness and in the prior art, a density increase entails lower strengths.

It further follows that with a pattern of 30 protrusions/cm$^2$, the product of the invention offers higher strength than a nested prior art product.

If the product feel is to be substantially improved, the lower density limit can be considered being 30 protrusions/cm$^2$. However, because the desired thickness cannot be achieved using a nested technique, the invention allows advantageously combining thickness and softness.

The softness of the products of the invention was measured. The results show that the products of the invention are softer than the known ones consisting of three plies and made in the so-called nested manner from plies identical with those of the products of the invention (same nature, same fiber and chemical composition, same manufacture).

Figure 2:
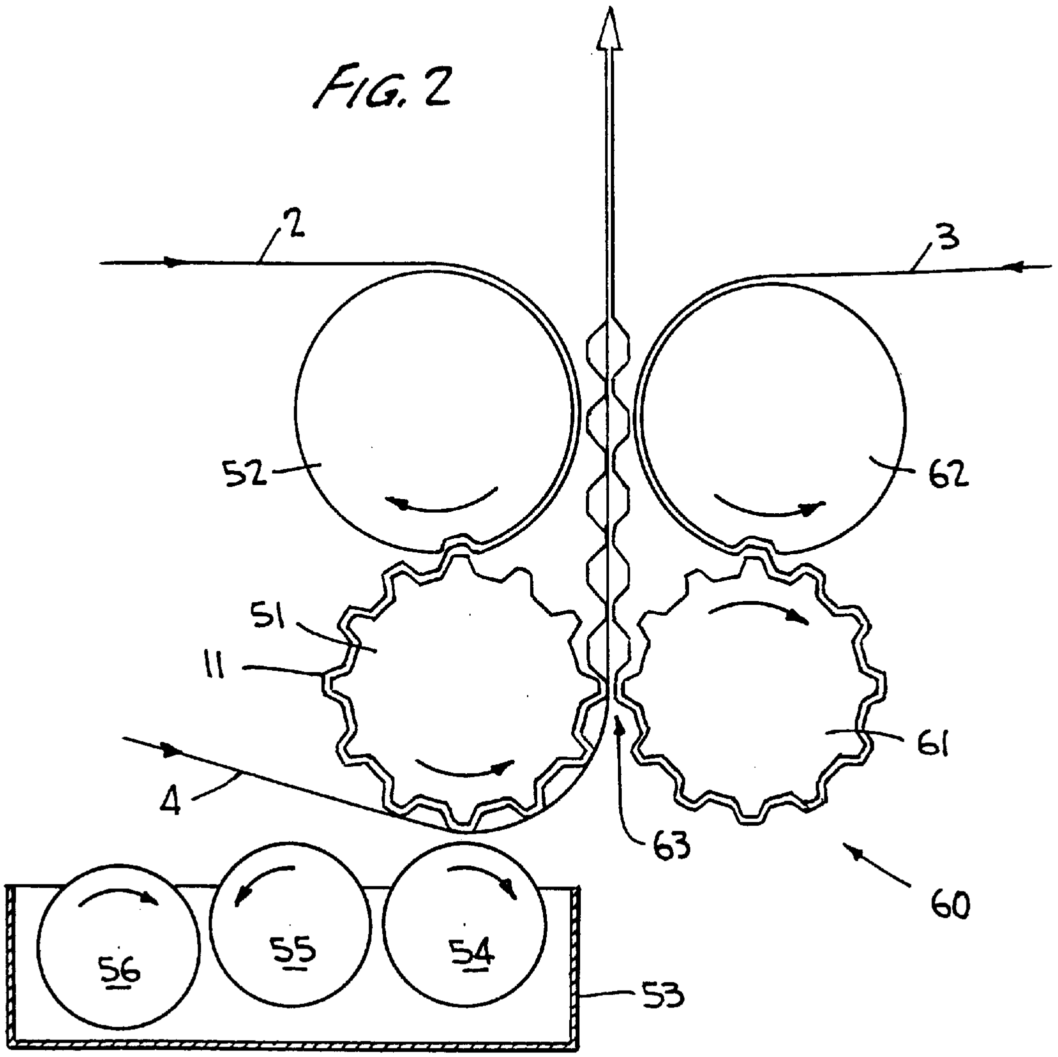
FIG. 2 diagrammatically shows the principle of the method of the invention.

The product illustrated in FIG. 1 is manufactured using a method as illustrated in FIG. 2.

With respect to FIG. 2, the first ply 2 is embossed in a first embossing means including an engraved cylinder 51 and a rubber mating cylinder 52, the cylinders 51 and 52 rotating in opposite directions. The unembossed central ply 4 is moved onto the external ply 2 which is resting against the surface of the engraved cylinder 51. The central ply 4 is superposed in such a manner that the protrusions 11 of the embossed external first ply 2 point toward the inside of the structure. An adhesive dispenser 53 places adhesive on the surface of the central ply 4 opposite the embossed external ply 2. The adhesive dispenser includes a depositing cylinder 54 coming to rest, by means of the superposed central ply 4 and external embossed ply 2, against the engraved cylinder 51; and a transfer cylinder 55 moving the adhesive from a cylindrical plunger 56 to the dispensing cylinder 54. The depositing cylinder withdraws the adhesive from a tub. The depositing cylinder exerts some pressure on the engraved cylinder at the distal surface of the protrusions of the external ply 2.

Using a second embossing means 60, the second external ply 3 is embossed separately but in parallel with the embossing of the first ply 2. The embossing means 60 includes an engraved cylinder 61 and a rubber mating cylinder 62. The two cylinders rotate in mutually opposite directions.

After the adhesive has been deposited on the free surface of the central ply, the external ply 2 and the central ply 4 are assembled with the second external embossed ply 3 by an assembling means or clamping gap 63 of the engraved cylinder 51 of the first embossing means and of the engraved cylinder 61 of the second embossing means, using the tip-to-tip technique.

The adhesive can be a standard PVA glue or a hot melt glue. Illustratively, a glue marketed by Swift Co. was used. This glue was diluted in water in optimal proportions to secure appropriate transfer to the plies.

It was observed that, following adhesive deposition on the unembossed central ply, but before combining the three plies at the clamping gap, the adhesive did impregnate the central ply but without "reaching" the external embossed ply on which the central ply was superposed. At this stage, no adhesive at all could be found on the surface of the external embossed ply in contact with the central ply. The bonding of the three plies takes place only when these three plies are being assembled. It is likely that the adhesive in the end crosses the central ply, when compressed, to reach the external embossed ply at the time the three plies move into the clamping gap.

It is clear that the manufacturing technique for a 3-ply web allows using apparatus designed for the manufacture of a conventional two-ply, tip-to-tip paper without the need for substantial modification of the parts or their adjustments.

Be it noted that even though the glue dispenser will make contact with an unembossed central ply, the transfer of glue takes place only at those ply surfaces which rest against the protrusions of the embossing cylinder.

In another but not shown embodiment, apparatus with two glue dispensers is used. However, such apparatus requires more significant adjustments and its operation is less flexible overall.

In yet another embodiment of the invention, also not shown, a hot melt glue is atomized by suitable means onto the inner surface of the external embossed plies, whereupon the third ply is sandwiched between the external plies and the set is assembled into a web. In this embodiment, the adhesive also can be deposited onto the third ply or between the external plies and the third ply, also uniformly over the full surface of the plies or only partially.

In yet another and not shown embodiment of the invention, an aqueous glue is atomized by suitable means onto the central ply prior to assembly. This procedure is carried out in such a manner that the energy imparted by atomization to the droplets is sufficient to pierce the central ply in order to ensure thereby the assembly of the three plies. In this embodiment as well, the adhesive can be spread uniformly over all or only part of the surface of the central ply.

As will be apparent to one skilled in the art, various modifications can be made within the scope of the aforesaid description. Such modifications being within the ability of one skilled in the art form a part of the present invention and are embraced by the appended claims.

What is claimed is:

1. An absorbent paper product comprising at least three plies including a first external embossed ply and a second external embossed ply with each comprising at least one salient pattern of at least in part discrete protrusions pointing inward towards an opposing ply, and an unembossed central ply; wherein the at least three plies are assembled by bonding distal surfaces of at least a portion of the discrete protrusions of each of said first external embossed ply and said second external embossed ply to said central ply, and wherein each of said first external embossed ply and said second external embossed ply is bonded by an adhesive to said central ply and at least one of the first external embossed ply and the second external embossed ply has a pattern density greater than 30 protrusions/$cm^2$, and further wherein said absorbent paper product has a specific surface weight of about 36 to about 105 g/$m^2$.

2. Product as claimed in claim 1 wherein each of the first external embossed ply and the second external embossed ply has a pattern density less than 90 protrusions/cm2.

3. Product as claimed in claim 1 or 2 wherein the first external embossed ply and the second external embossed ply have different pattern densities.

4. Product as claimed in claim 1 or 2 wherein patterns of each of the first external embossed ply and the second external embossed ply are different, with at least one of the first external embossed ply and the second external embossed ply comprising combined patterns.

5. Product as claimed in claim 3 wherein patterns of each of the first external embossed ply and the second external embossed ply are different, with at least one of the first external embossed ply and the second external embossed ply comprising combined patterns.

6. Product as claimed in claim 4 wherein the combined patterns are at two different elevations.

7. Product as claimed in claim 5 wherein the combined patterns are at two different elevations.

8. Product as claimed in claim 1 wherein the central ply has a specific surface weight which differs from a specific surface weight of at least one of the first external embossed ply and the second external embossed ply.

9. Product as claimed in claim 1 wherein the central ply includes at least one of a fibrous composition or chemical composition which differs from a fibrous composition or chemical composition of at least one of the first external embossed ply and the second external embossed ply.

10. Product as claimed in claim 9 wherein at least one of the first external embossed ply and the second external embossed ply is fibrous and includes essentially short fibers, and the central ply is fibrous and includes essentially long fibers.

11. Product.as claimed in claim 9 or 10 wherein at least one of the first external embossed ply and the second external embossed ply contains a softener.

12. Product as claimed in claim 7 wherein the central ply includes a wet-strength agent.

13. Product as claimed in claim 8 wherein the central ply includes a wet-strength agent.

14. Product as claimed in claim 11 wherein the central ply includes a wet-strength agent.

15. Product as claimed in claim 1 wherein delamination strength of one of the first external embossed ply and the second external embossed ply relative to the central ply substantially differs from delamination strength of the other external ply relative to the central ply.

16. Product as claimed in claim 1 wherein the product is toilet paper.

17. Product as claimed in claim 1 wherein the product is a handkerchief or napkin.

* * * * *